United States Patent
Lu

(10) Patent No.: US 10,687,510 B2
(45) Date of Patent: Jun. 23, 2020

(54) EASY-TO-FOLD AND EASY-TO-ASSEMBLE BOX AND PET HOUSE USING THE BOX

(71) Applicant: Xiamen Sunnypet Products Co.,Ltd., Xiamen (CN)

(72) Inventor: Kongzhi Lu, Xiamen (CN)

(73) Assignee: XIAMEN SUNNYPET PRODUCTS CO., LTD., Xiamen (CN)

( * ) Notice: Subject to any disclaimer, the term of this patent is extended or adjusted under 35 U.S.C. 154(b) by 301 days.

(21) Appl. No.: 15/841,303

(22) Filed: Dec. 14, 2017

(65) Prior Publication Data
US 2019/0150399 A1 May 23, 2019

(30) Foreign Application Priority Data
Nov. 21, 2017 (CN) .......................... 2017 1 1168055

(51) Int. Cl.
*A01K 1/035* (2006.01)
*A01K 1/03* (2006.01)

(52) U.S. Cl.
CPC .............. *A01K 1/035* (2013.01); *A01K 1/034* (2013.01)

(58) Field of Classification Search
CPC ...... A01K 1/035; A01K 1/034; A01K 1/0035; A01K 1/0236; A01K 1/0245; A01K 1/03; A01K 1/031; A01K 1/032; A01K 1/033; A01K 1/0125; A01K 31/08
See application file for complete search history.

(56) References Cited

U.S. PATENT DOCUMENTS

| | | | | |
|---|---|---|---|---|
| 5,582,135 | A * | 12/1996 | Bellows | A01K 1/0125 119/168 |
| 6,216,638 | B1 * | 4/2001 | Pivonka | A01K 1/0245 119/496 |
| 2005/0145192 | A1 * | 7/2005 | Axelrod | A01K 1/0245 119/499 |
| 2005/0257750 | A1 * | 11/2005 | Simon | A01K 1/033 119/499 |
| 2006/0037554 | A1 * | 2/2006 | Axelrod | A01K 1/0245 119/499 |
| 2006/0107903 | A1 * | 5/2006 | Jin | A01K 1/033 119/499 |
| 2008/0017129 | A1 * | 1/2008 | Dizon | A01K 1/0245 119/498 |
| 2008/0121188 | A1 * | 5/2008 | Axelrod | A01K 1/0245 119/499 |

(Continued)

*Primary Examiner* — Trinh T Nguyen
(74) *Attorney, Agent, or Firm* — Bayramoglu Law Offices LLC

(57) ABSTRACT

An easy-to-fold and easy-to-assemble box includes a left panel, a right panel, a front frame, a rear frame, a bottom panel and a top cover. The left panel and the right panel are both formed by connecting two or more sideboards through rotatable connectors. A rotatable connection end of the bottom panel is connected to a lower part of the rear frame through a rotatable connector. A movable end of the bottom panel braces against the front frame. An inner side of each of the two ends of the rear frame is provided with a vertical edge strip. One end of each of the left panel and the right panel is connected to the vertical edge strip through a rotatable connector, and the other end is connected to the front frame. The top cover is connected to the front frame through a connector.

3 Claims, 17 Drawing Sheets

(56) References Cited

U.S. PATENT DOCUMENTS

| | | | |
|---|---|---|---|
| 2008/0156276 A1* | 7/2008 | Denenberg | A01K 1/0245 119/514 |
| 2010/0258059 A1* | 10/2010 | Lott | A01K 1/0245 119/499 |
| 2010/0313822 A1* | 12/2010 | Huang | A01K 1/03 119/453 |
| 2012/0234252 A1* | 9/2012 | Donta | A01K 1/0125 119/168 |
| 2017/0359998 A1* | 12/2017 | Kim | A01K 1/0035 |

* cited by examiner

EASY-TO-FOLD AND EASY-TO-ASSEMBLE BOX AND PET HOUSE USING THE BOX

CROSS REFERENCE TO RELATED APPLICATIONS

This application is based upon and claims priority to Chinese Patent Application No. 201711168055.3, filed on Nov. 21, 2017, the entire contents of which are incorporated herein by reference.

TECHNICAL FIELD

The present invention relates to the field of furniture, and more specifically to an easy-to-fold and easy-to-assemble box and a pet house using the box.

BACKGROUND

In order to reduce transportation costs and the packaging volume of products, most of the manufacturers tend to provide conventional box-structure furniture with a detachable multi-piece structure. This type of detachable box structure has many components. The installation needs to be done by referring to the instructions. In addition, the assistance from others is required to support the positioning, so the assembly is not only difficult but also time-consuming. Generally, it may take about 10-20 minutes to complete the assembly. Moreover, the structure of the assembled box lacks stability. For this reason, an easy-to-fold and easy-to-assemble box and a pet house using the box are provided.

SUMMARY

The present invention provides an easy-to-fold and easy-to-assemble box and a pet house using the box, so as to solve the problems of the existing boxes or pet houses like the structure of existing boxes or pet houses has too many components, is difficult to assemble, hard to assemble completely by a single person, and assembly is time-consuming, etc.

The present invention uses the following technical solutions. An easy-to-fold and easy-to-assemble box includes a left panel, a right panel, a front frame, a rear frame, a bottom panel, and a top cover. The left panel and the right panel are formed by connecting two or more sideboards in a vertical direction through a first rotatable connector; the bottom panel has a rotatable connection end and a movable end; the rotatable connection end is rotatably connected to a lower part of the front frame or a lower part of the rear frame through a second rotatable connector; a bottom surface of the movable end abut against the lower part of the rear frame or the lower part of the front frame; an inner side of each of the two ends of the front frame or the rear frame is provided with a vertical edge strip; the length of the vertical edge strip along a length extending direction of the left panel is not less than the thickness of the bottom panel; one end of each of the left panel and the right panel is connected to the vertical edge strip through a third rotatable connector; the other end of each of the left panel and the right panel is correspondingly connected to the rear frame or the front frame; the top cover is connected to an upper part of an outer wall of the front frame or the rear frame through a 360-degree rotational connector; the top cover is turned downward to abut against an outer side wall of the front frame or the rear frame; the bottom panel is turned upward to abut against an inner wall of the front frame or the rear frame; and the sideboards of the left panel and the right panel are sequentially folded to make the front frame and the rear frame move toward each other, so as to fold the box.

Furthermore, the left panel and the right panel are both formed by connecting two sideboards through hinges.

Furthermore, the lower part of the rear frame or the front frame is provided with a support bar. A bottom surface of the bottom panel is horizontally supported by the support bar on a top surface of the support bar. The bottom panel is provided with a handle hole.

Furthermore, each bottom part of two sideboards respectively located on the left side and right side near the support bar is provided with a space avoiding groove that is matched with the support bar.

Furthermore, a door panel or cloth is arranged within the front frame. Also, a door panel or cloth is arranged within the rear frame.

The present invention further provides a pet house including the above-mentioned easy-to-fold and easy to assemble box. A front frame or a rear frame of the box is provided with a pet entrance opening.

Furthermore, the left panel and the right panel are both formed by connecting two sideboards. The top surfaces of the two sideboards are connected to each other to form an inclined surface structure. Moreover, the front frame or the rear frame corresponding to a high end of the inclined surface is higher than the rear frame or the front frame corresponding to a lower end. The top cover is slantwise arranged on the top surfaces of the front frame and the rear frame.

Furthermore, the left panel and the right panel are both formed by connecting two sideboards. The top surfaces of the two sideboards form an inverted V-shaped structure. The top cover includes two top boards. The two top boards correspondingly cover the top surfaces of the left panel and the right panel, respectively.

Furthermore, one end of each of the two top boards is correspondingly connected to an upper part of the front frame or the rear frame through the 360-degree rotational connector, and the other end of each of the two top boards is correspondingly connected to each other.

Furthermore, the other end of each of the two top boards is connected with each other to form a "λ" shape structure.

Furthermore, one end of one top board is connected to an upper part of an outer wall of the front frame or the rear frame through the 360-degree rotational connector; and the other end of this top board is connected to the other top board through a rotatable connector.

In view of the above description of the structure of the present invention and compared with the prior art, the present invention has the following advantages.

1. The box of the present invention has an integrated structure. One end of the bottom panel is connected to the front frame or the rear frame through a rotatable connector, so that the bottom panel can be turned upward. Moreover, the vertical edge strips are further provided between the inner side of both ends of the front frame or the rear frame and the foldable left panel and right panel so that the left panel and the right panel, being folded inwardly, would not collide with the bottom panel being turned upward to abut against the front frame or the rear frame. The top cover is connected to the upper part of the front frame or the rear frame through a 360-degree rotational connector. When the box is folded, firstly, the top cover is turned upward to be in an upright state, and then the top cover is turned downward by 180 degrees to abut against the outer wall of the front frame or the rear frame. After that, the bottom panel is turned to abut against the inner side of the front frame or the rear frame. Finally, the left panel and the right panel are folded inwards to form a layered structure. During the assembling process, firstly, the left panel and the right panel are expanded to a planar body, then the bottom panel is turned to be in a horizontal state, and finally, the top cover is turned upward to be placed on the top surfaces of the left panel and the right panel.

2. The box of the present invention does not require dismounting any connectors when the box is folded. The top cover can be turned downward to abut against the outer wall of the front frame or the rear frame, and the bottom panel can be turned to abut against the inner side of the front frame or the rear frame. Moreover, the left panel and the right panel can be folded inwards to form a layered structure so that the package and storage volume of the box is greatly reduced. When the box is assembled, there is no need to fix any connectors, and only the top cover and the bottom panel need to be turned, and the left panel and right panel need to be extended. The folding and assembling of the box is very convenient, which reduces the difficulty of disassembly and assembly of the box and shortens the folding and assembling time. In addition, the box having such a structure can also be used as a locker.

3. The pet house of the present invention is integrally formed by a box having a top cover. No connectors are required in the folding and assembling. Moreover, after being folded, the box has a small size, which is convenient for transportation. Additionally, the assembling is very simple, which can be completed without referring to the instruction books and assistance of others, so that a single person can finish the work quickly in a short time.

DETAILED DESCRIPTION OF THE INVENTION

Figure 1:
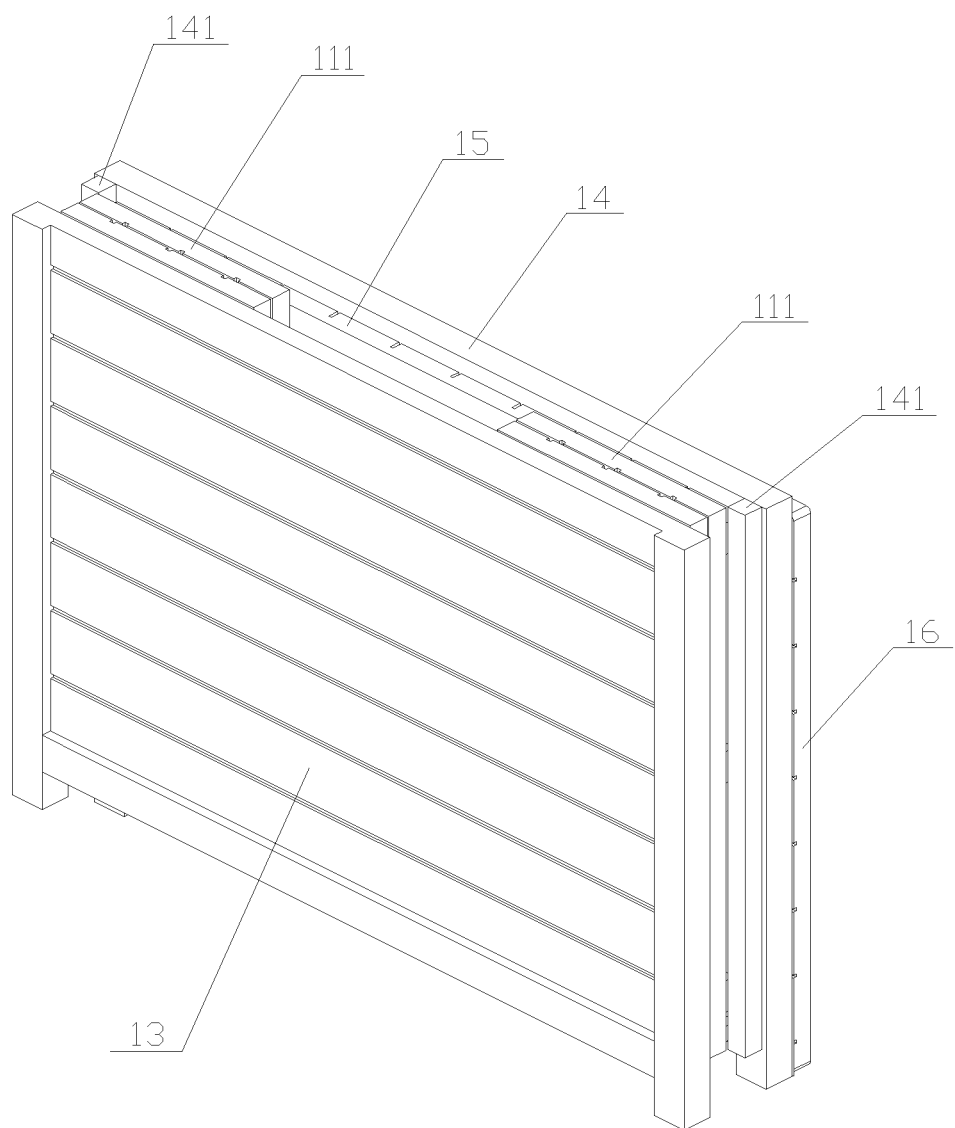
FIG. 1 is a structural schematic view of according to the first embodiment of the present invention in a folded state.

Specific embodiments of the present invention will be described with reference to the drawings hereinafter.

Embodiment 1

Referring to FIG. 1 to FIG. 7, the easy-to-fold and easy-to-assemble box includes a left panel 11, a right panel 12, a front frame 13, a rear frame 14, a bottom panel 15 and a top cover 16. Specifically, the left panel 11 and the right panel 12 are both formed by connecting two or more sideboards in a vertical direction through rotatable connectors. Preferably, the left panel and the right panel are both formed by connecting two sideboards having equal width rotatable connectors. A door panel or cloth is arranged within the front frame 13. Also, a door panel or cloth is arranged within the rear frame 14. When the door panel is arranged within the front frame 13 and the rear frame 14, the door panel is integrally formed with the front frame 13 or the rear frame 14 to form a side panel structure. The bottom panel 15 has a rotatable connection end and a movable end. Moreover, the rotatable connection side is rotatably connected to the lower part of the rear frame 14 or the lower part of the front frame through the rotatable connectors. In this embodiment, the rotatable connection end of the bottom panel is connected to the lower part of the rear frame 14, and the bottom surface of the movable end abuts against the lower part of the front frame 13, correspondingly. The lower part of the front frame 13 is provided with a support bar 131. The bottom surface of the movable end of the bottom panel 15 is horizontally supported by the support bar 131 on the top surface of the support bar 131. Moreover, the bottom panel 15 is provided with a handle hole 150 to pull up the bottom panel 15.

Figure 2:
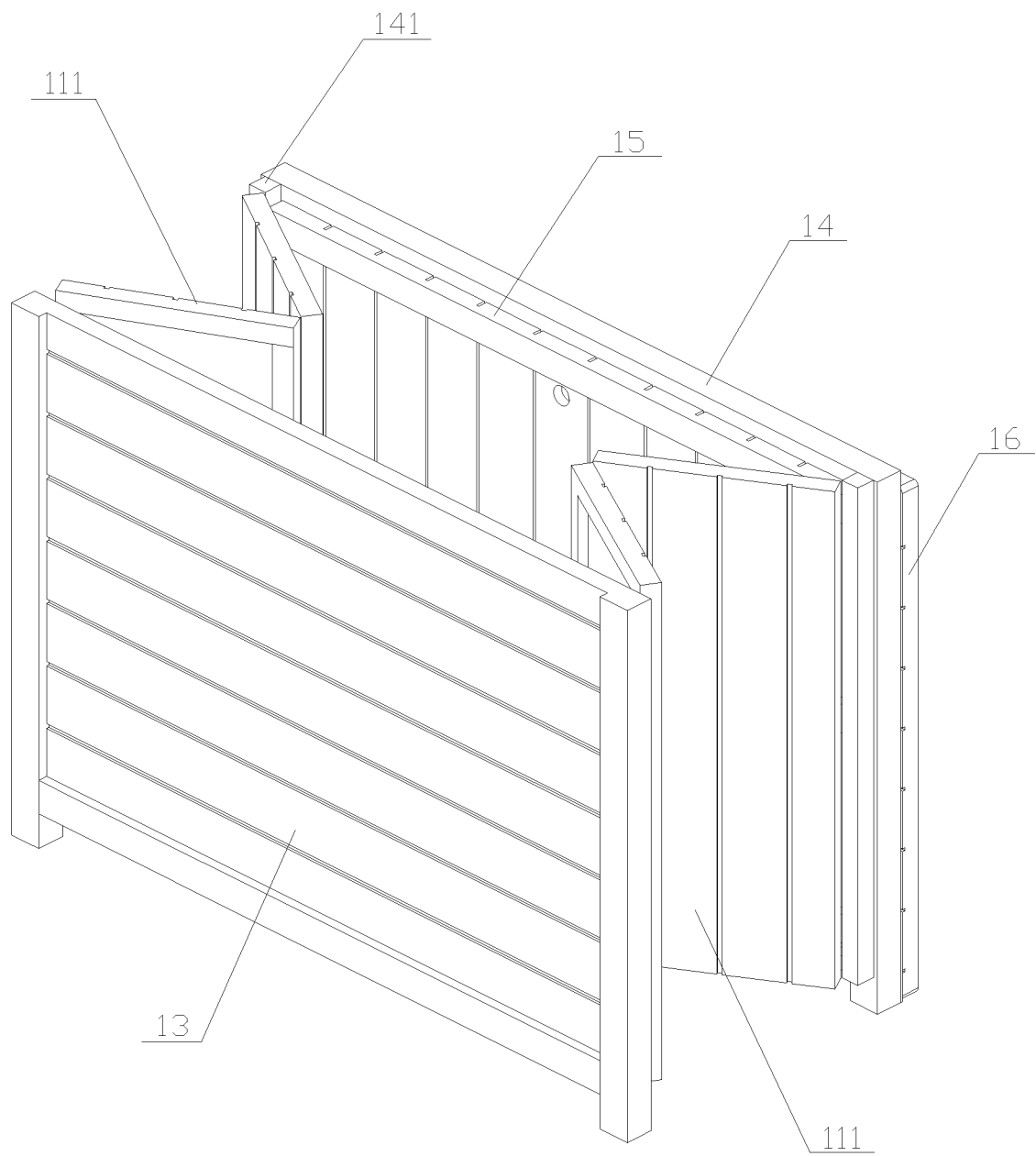
FIG. 2 is a structural schematic view according to the first embodiment of the present invention where a left panel and a right panel are in a half-expanded state.
Figure 3:
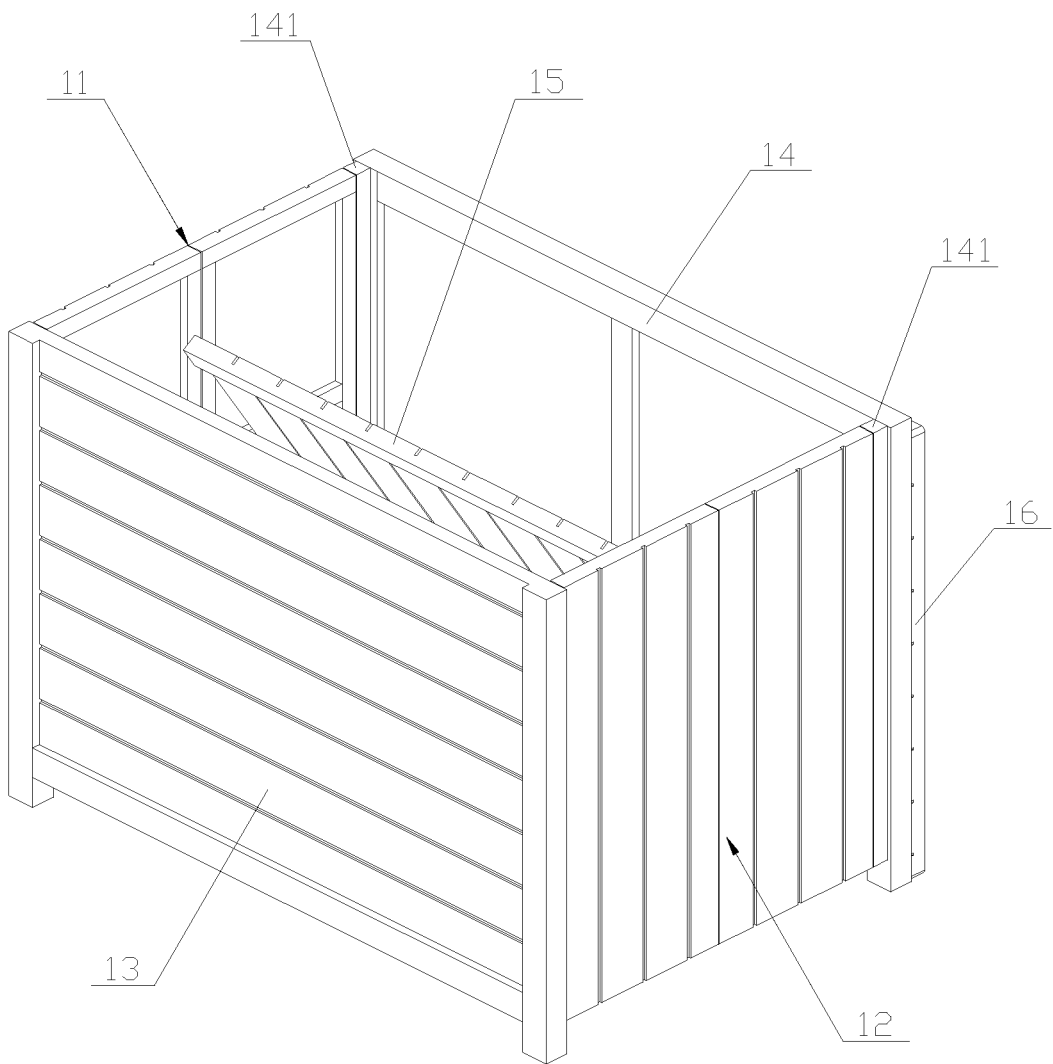
FIG. 3 is a structural schematic view according to the first embodiment of the present invention where a bottom panel is turned downward.
Figure 4:
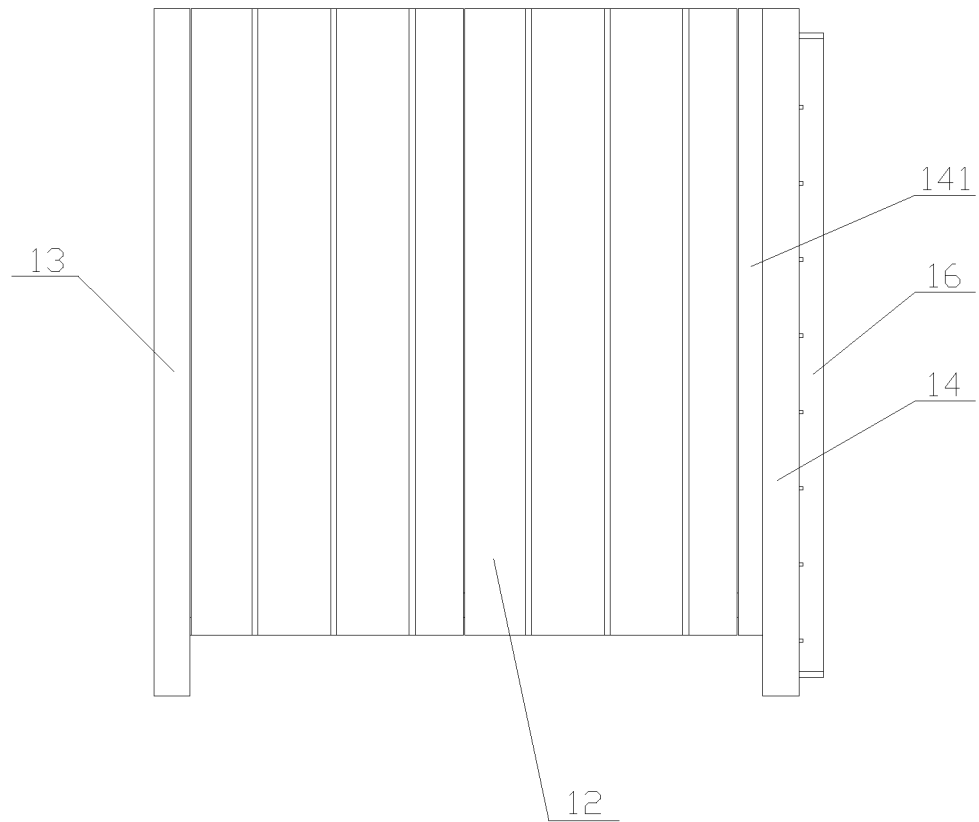
FIG. 4 is a right-side view of FIG. 3.
Figure 5:
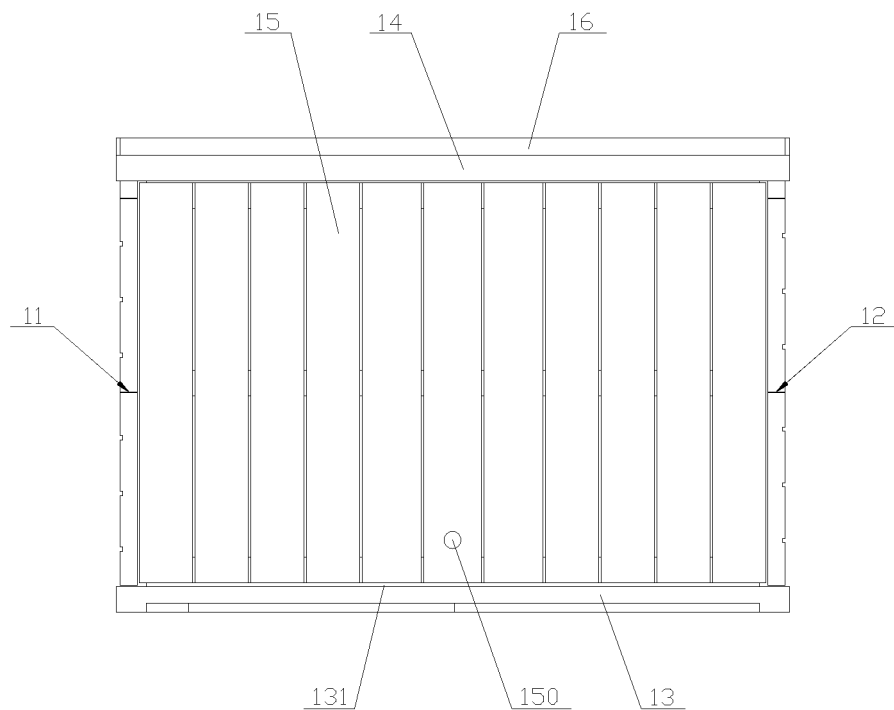
FIG. 5 is a top view of FIG. 3.

Referring to FIG. 1 to FIG. 3, the inner sides of two ends of the rear frame 14 are respectively provided with a vertical edge strip 141. The length of the vertical edge strip 141 along the length extension direction of the left panel 11 is not less than the thickness of the bottom panel 15. The vertical side strips 141 located on the two sides do not stick out from the width direction of the left panel 11 and the right panel 12 to ensure sufficient space between the two vertical side strips for accommodating the bottom panel 15 that is turned upward. The left panel 11 and the right panel 12 each have a side that is connected to the vertical side strip 141 through a rotatable connector. Moreover, the left panel 11 and the right panel 12 each have another side that is correspondingly connected to the front frame 13. The bottom panel 15 is turned upward to abut against the inner wall of the rear frame 14. The sideboards of the left panel 11 and the right panel 12 are sequentially folded so that the front frame 13 and the rear frame 14 move toward each other to make the box folded.

Figure 6:
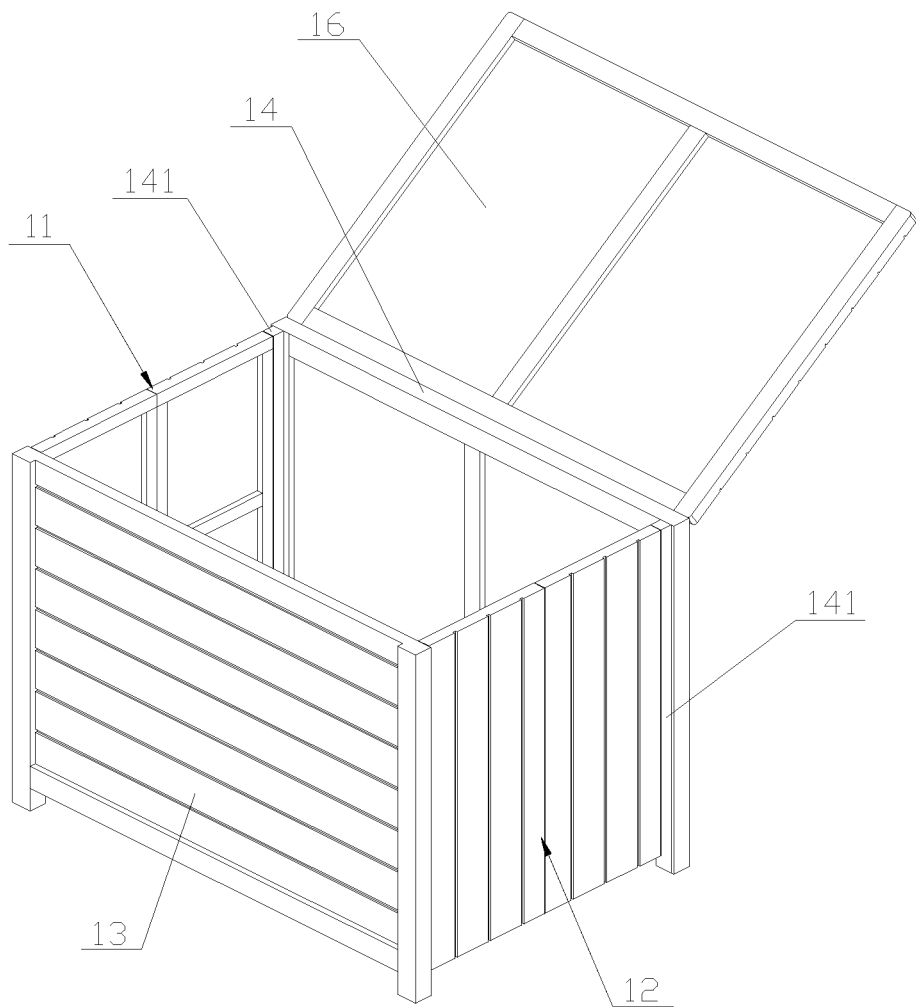
FIG. 6 is a structural schematic view according to the first embodiment of the present invention where a top cover is turned upward.
Figure 7:
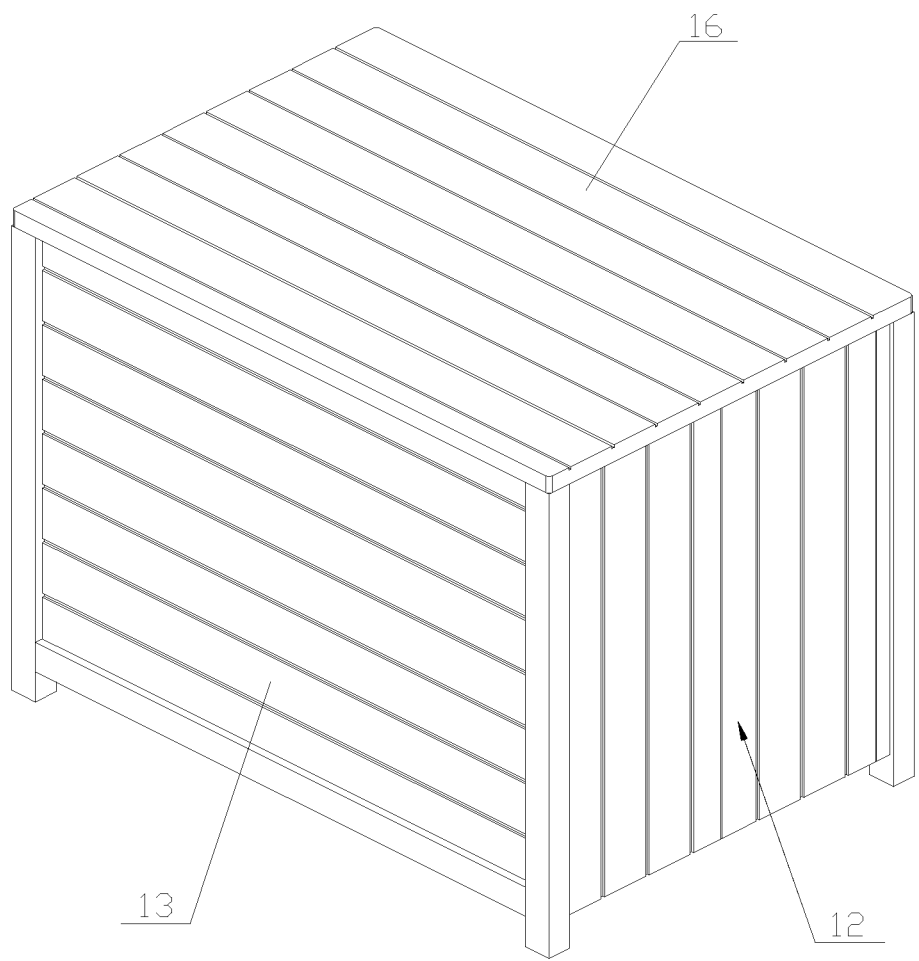
FIG. 7 is a structural schematic view according to the first embodiment of the present invention where the assembly is completed.

Referring to FIG. 6 and FIG. 7, the top cover 16 is connected to the upper part of the outer wall of the front frame 13 or the rear frame 14 through a 360-degree rotational connector. The top cover 16 is turned downward to abut against the outer side wall of the front frame 13 or the rear frame 14.

The bottom panel 15 also can be formed by connecting a plurality of sideboards through rotatable connectors. Preferably, the rotatable connector is a hinge, and the 360-degree rotational connector is a double hinge.

When the box having such a structure is folded, firstly, the top cover 16 is turned upward to be in an upright state, and then the top cover is turned downward by 180 degrees to abut against the outer wall of the front frame 13 or the rear frame 14. Subsequently, the bottom panel 15 is turned over to abut against the inner side of the front frame 13 or the rear frame 14. Finally, the left panel 11 and the right panel 12 are folded inwardly to form a layered structure. When the box is assembled, firstly, the left panel 11 and the right panel 12 are expanded into a planar body, and then the bottom panel 15 is turned over to be in a horizontal state. Finally, the top cover 16 is turned upward to be placed on the top surfaces of the left panel 11 and the right panel 12.

Embodiment 2

Figure 8:
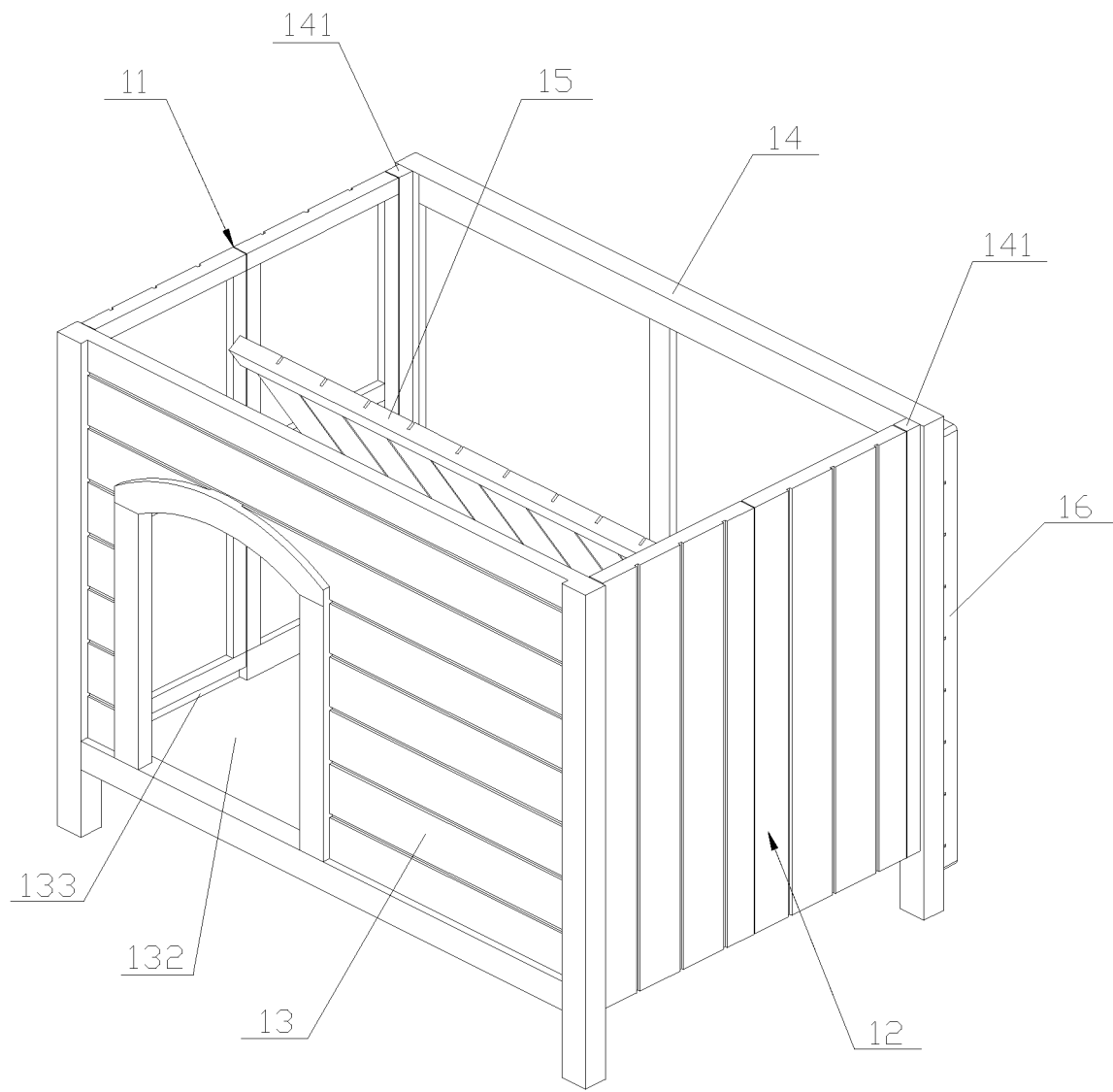
FIG. 8 is a structural schematic view according to the second embodiment of the present invention where the bottom panel is turned downward.
Figure 9:
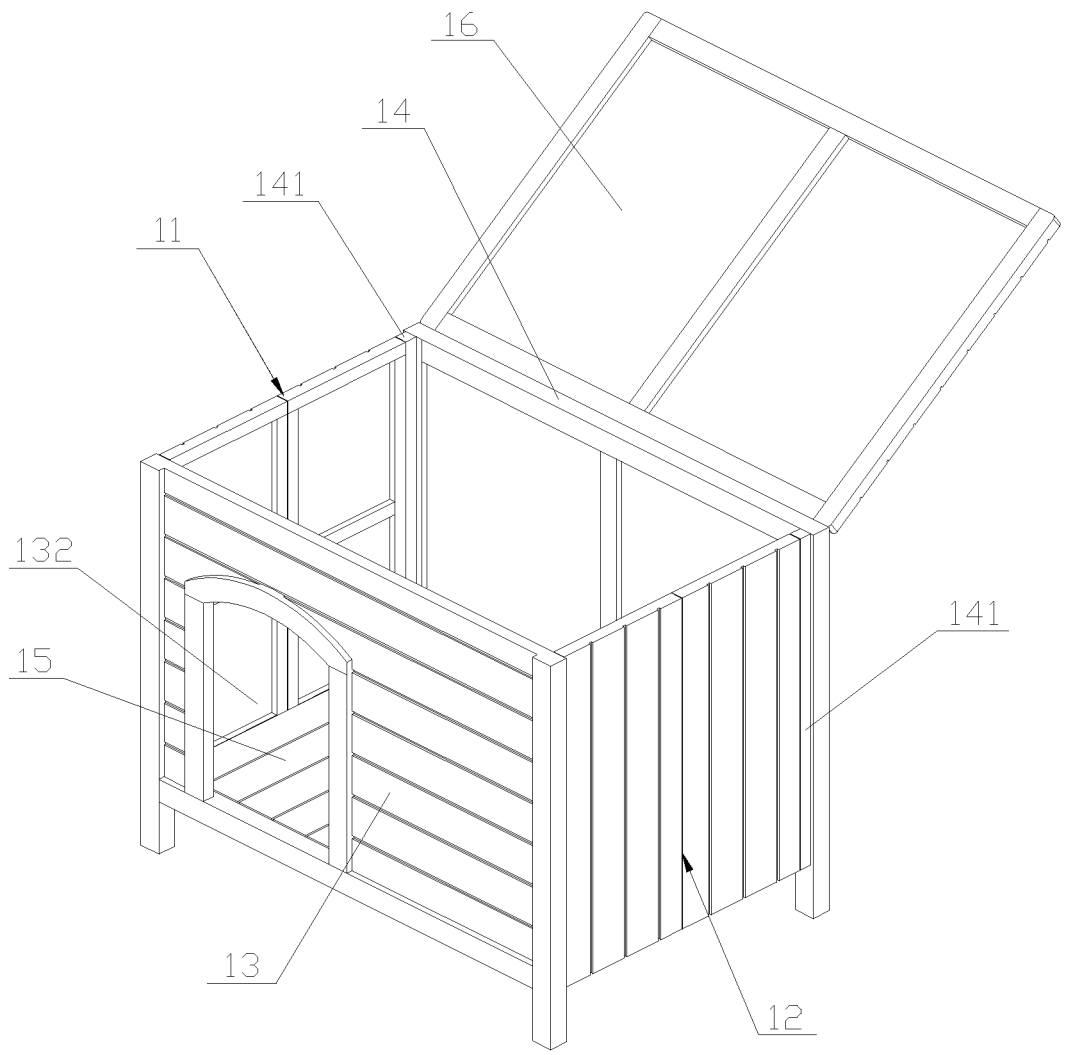
FIG. 9 is a structural schematic view according to the second embodiment of the present invention where the top cover is turned upward.
Figure 10:
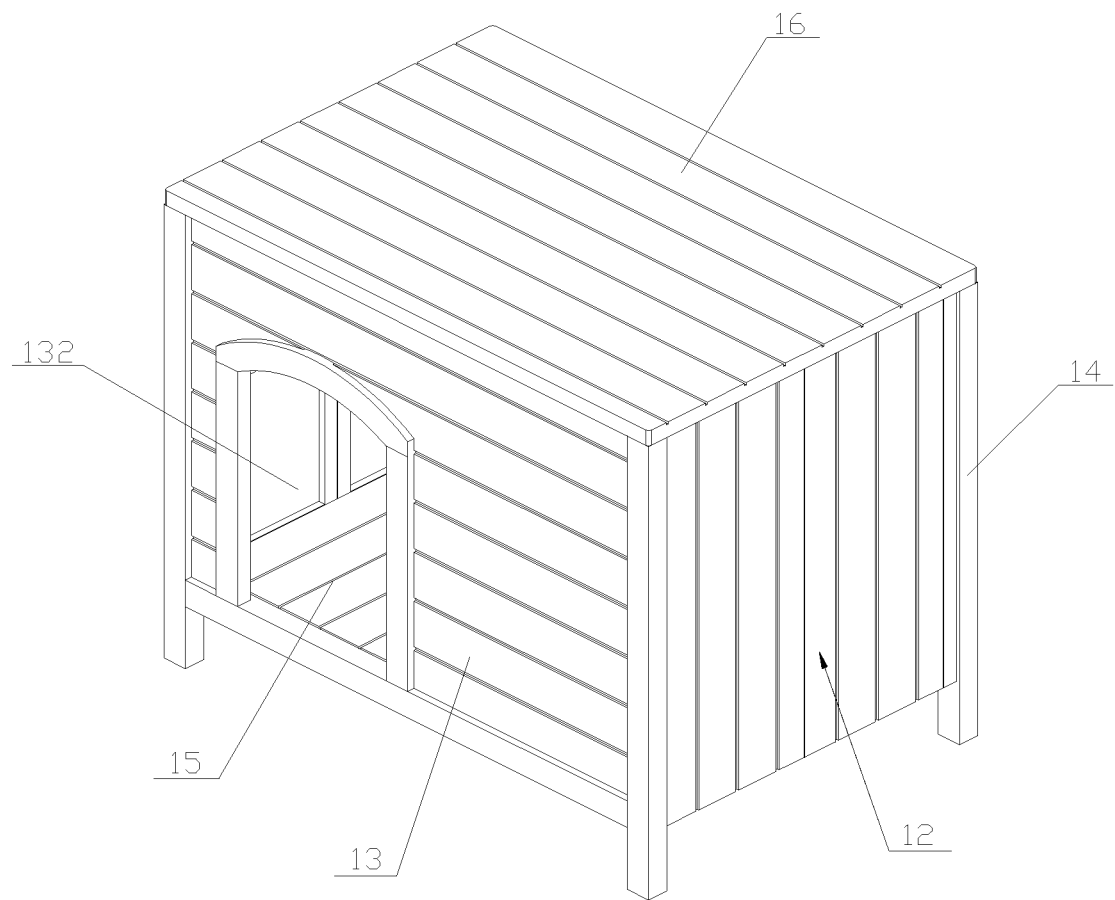
FIG. 10 is a structural schematic view according to the second embodiment of the present invention where the assembly is completed.

Referring to FIG. 8 to FIG.10, based on the box described in the first embodiment, the present embodiment provides a pet house including the above-mentioned box structure. The front frame 13 (or the rear frame) of the box is provided with a pet entrance 132. The bottom portion of two sideboards respectively located on the left side and right side near the support bar 131 inside the box are provided with a space avoiding groove 133 which is matched with the support bar 131. In this embodiment, the top surfaces of the front frame 13 and the rear frame are both planar surfaces which have the same height. The left side panel 11 and the right panel 12 are both formed by connecting two identical sideboards. The top surfaces of the two sideboards are arranged with the top surfaces of the front frame 13 and the rear frame 14. The top cover 16 horizontally covers on the top surfaces of the front frame 13 and the rear frame 14.

Embodiment 3

Figure 11:
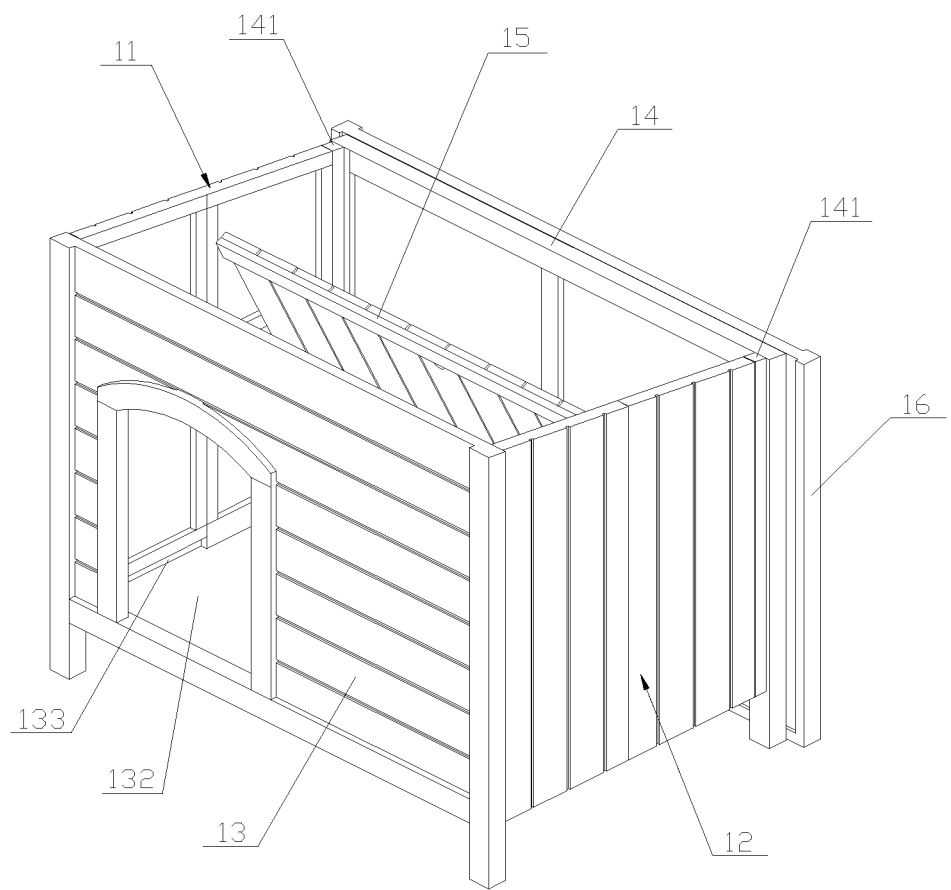
FIG. 11 is a structural schematic view according to the third embodiment of the present invention where the bottom panel is turned downward.
Figure 12:
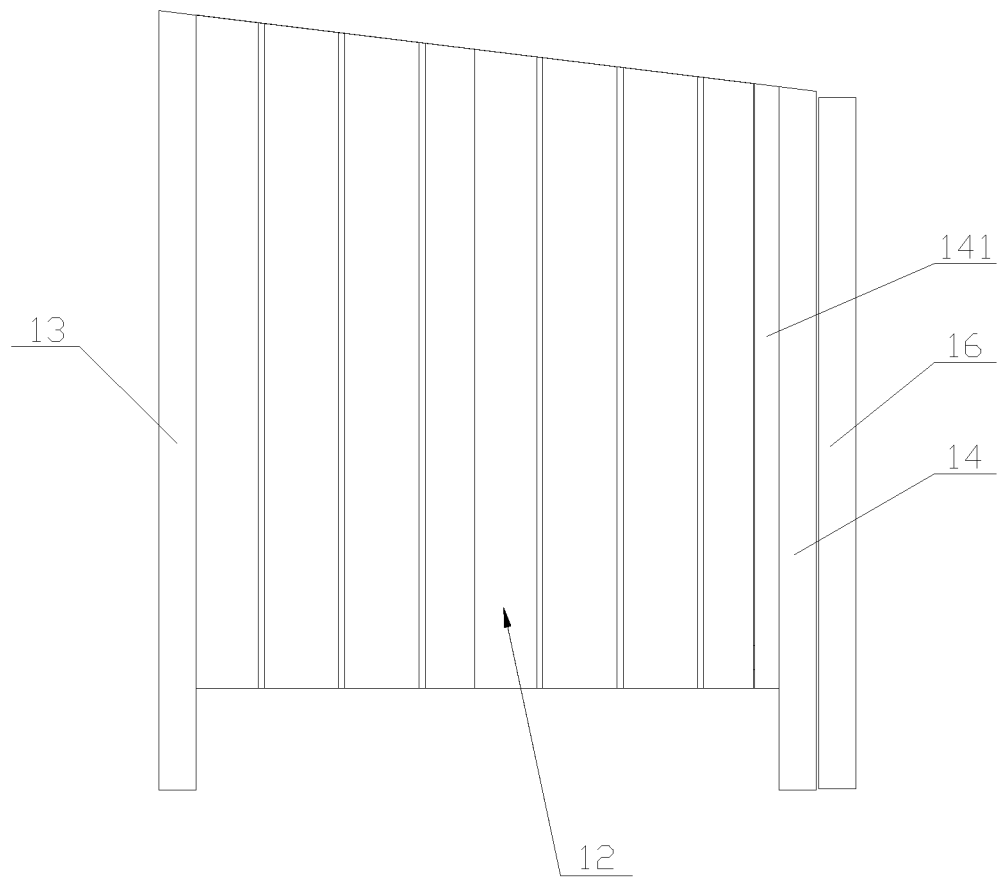
FIG. 12 is a right-side view of FIG. 11.
Figure 13:
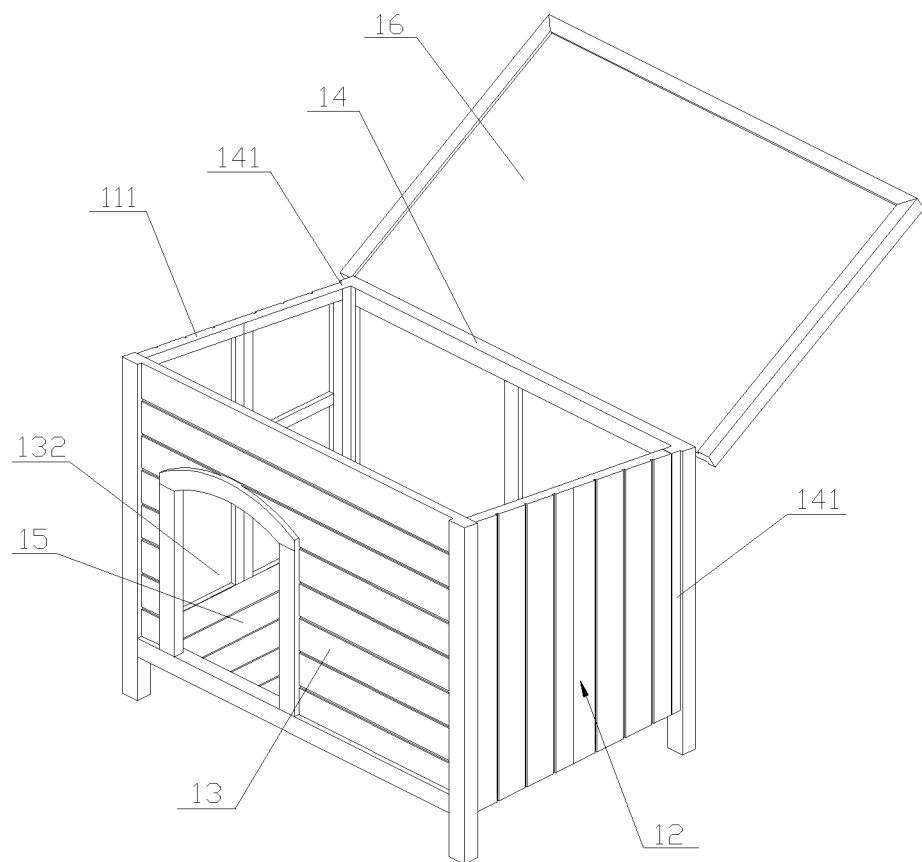
FIG. 13 is a structural schematic view according to the third embodiment of the present invention where the top cover is turned upward.

Referring to FIG. 11 to FIG. 13, the pet house, the left panel 11 and the right panel 12 of pet house of the present embodiment are also formed by connecting two sideboards 111. The top surfaces of the two sideboards are connected to each other to form an inclined surface structure. Moreover, the front frame 13 (or the rear frame) corresponding to the relatively high end of the inclined surface is higher than the rear frame 14 (or the front frame) corresponding to the relatively low end. The top cover 16 is slantwise placed on the top surfaces of the front frame 13 and the rear frame 14.

Embodiment 4

Figure 14:
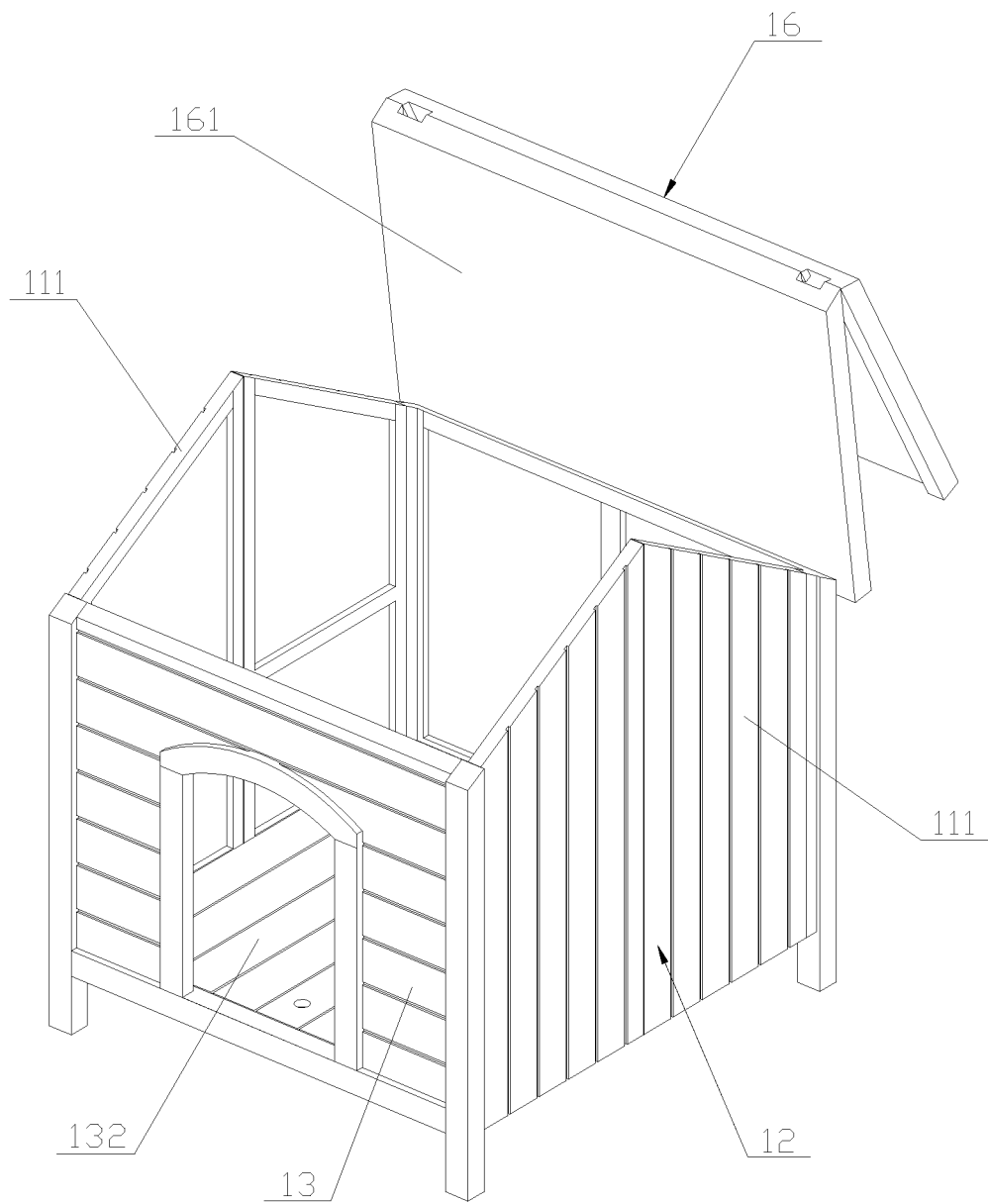
FIG. 14 is a structural schematic view according to the fourth embodiment of the present invention of the top cover being turned upward.
Figure 15:
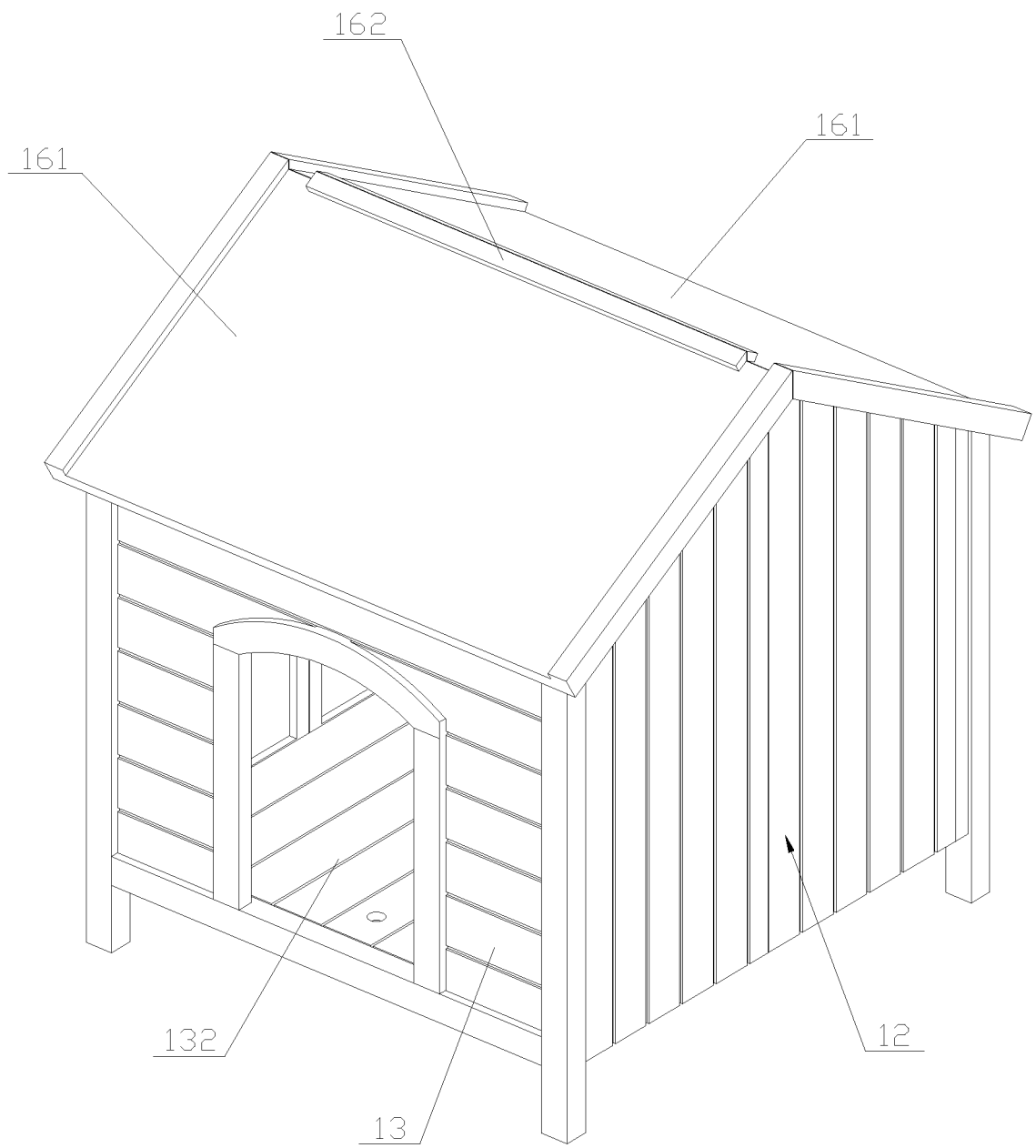
FIG. 15 is a structural schematic view according to the fourth embodiment of the present invention where the assembly is completed.

Referring to FIG. 14 and FIG. 15, the left panel 11 and the right panel 12 of the pet house of the present embodiment are formed by connecting two symmetric sideboards 111. The top surfaces of the two sideboards 111 form an inverted V-shaped structure. The top cover 16 includes two top boards 161. Specifically, one end of one top board is connected to the upper part of the outer wall of the rear frame (or front frame) through a 360-degree rotational connector, and the other end of the top board 161 is connected to another top board 161 through a rotatable connector. The two top boards 161 are each provided with a connecting board 162 at the connecting position. The two connecting boards 162 are connected to each other through a wedge-shaped sealing structure to prevent the inflow of rainwater to the pet house from the connection of the two top boards 161.

Embodiment 5

Figure 16:
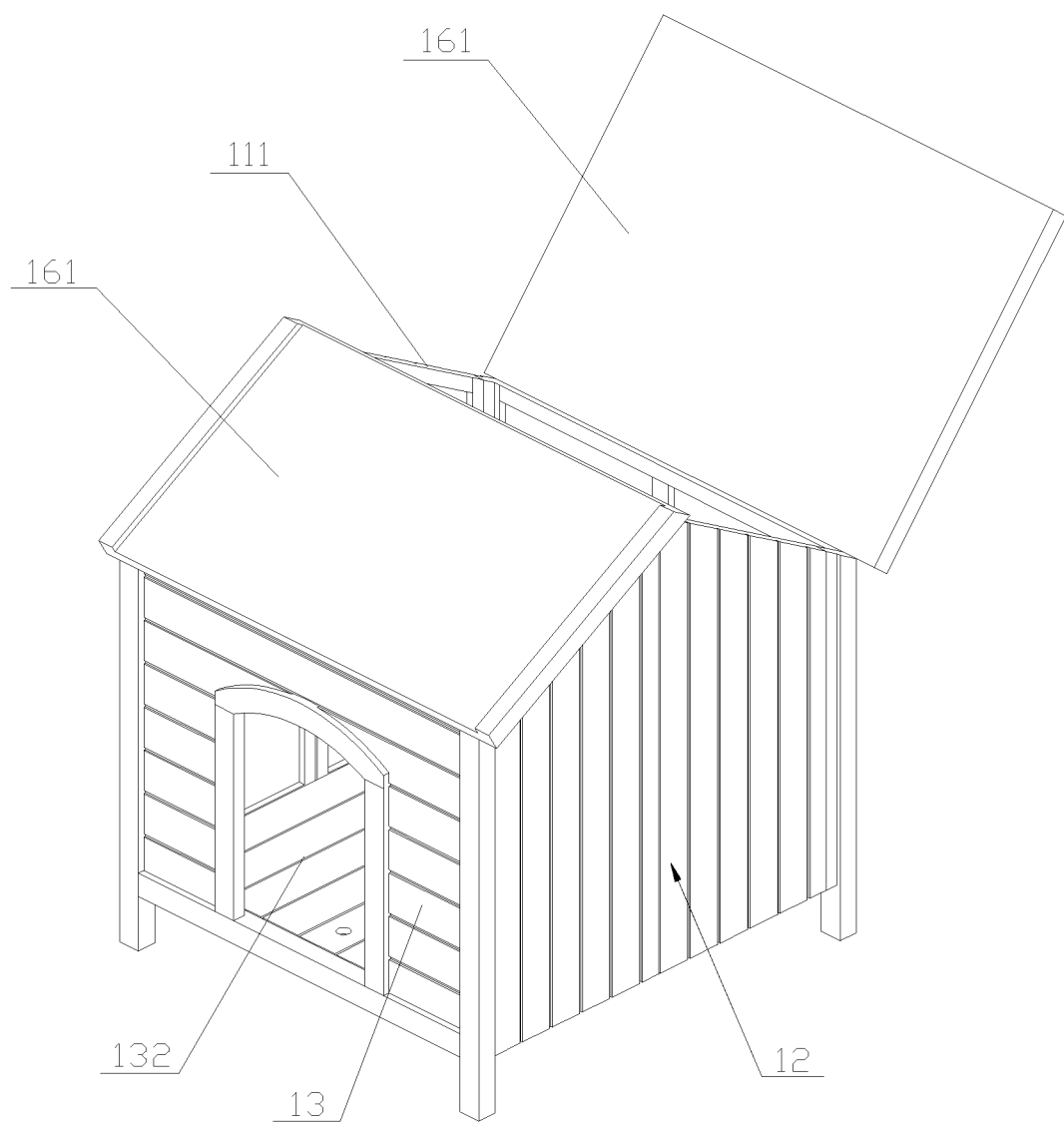
FIG. 16 is a structural schematic view according to the fifth embodiment of the present invention where the top cover is turned upward.
Figure 17:
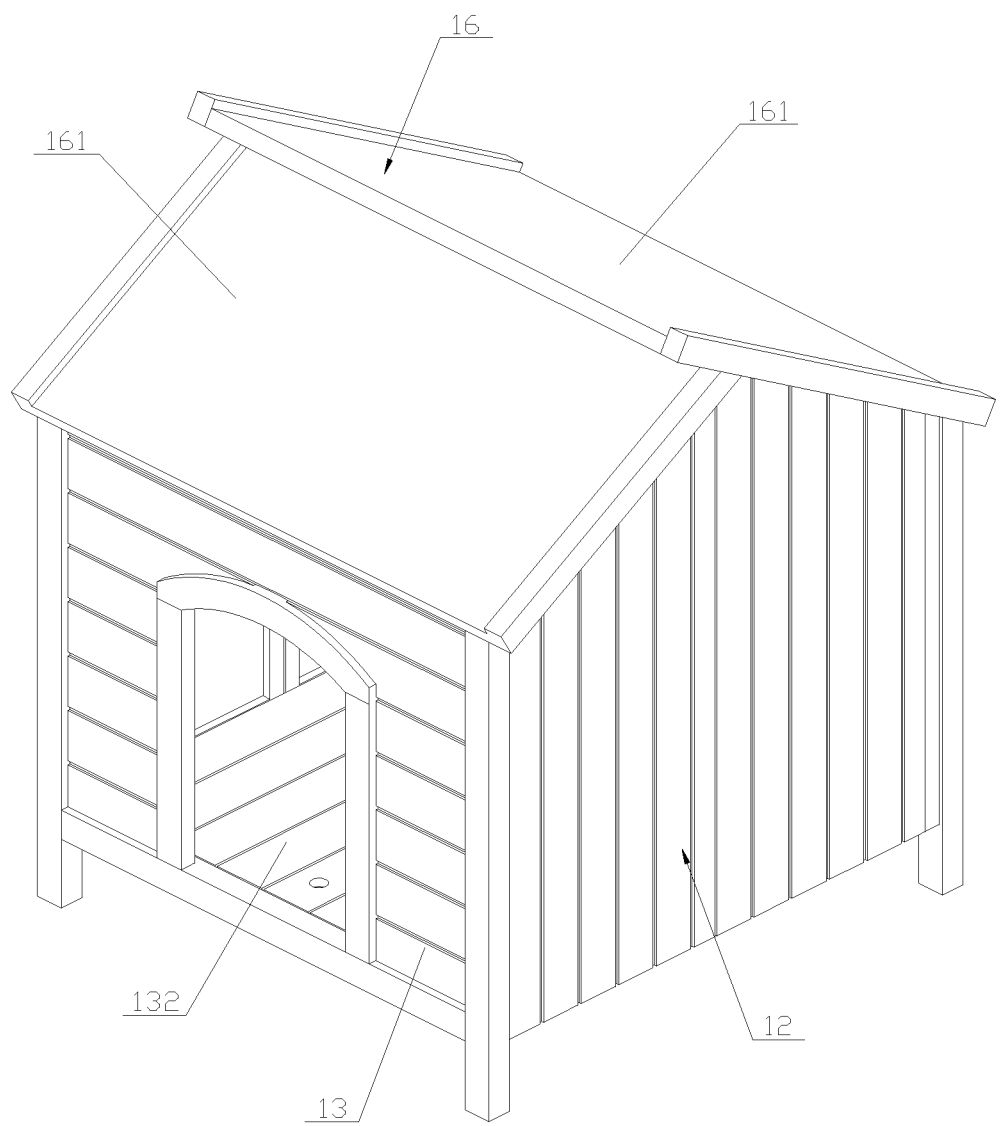
FIG. 17 is a structural schematic view according to the fifth embodiment of the present invention where the assembly is completed.

Referring to FIG. 16 and FIG. 17, the main difference between the pet house of this embodiment and the fourth embodiment is the top cover. The top cover 16 in this embodiment also includes two top boards. One end of each of the two top boards 161 is correspondingly connected to the upper parts of the front frame 13 and the rear side frame 14, respectively, through a 360-degree rotational connector. The other end of each of the two top boards is correspondingly arranged to form a "λ" shaped structure which can prevent the inflow of rainwater to the pet house.

The foregoing are only the specific embodiments of the present invention, and the design concept of the present invention is not limited thereto. Any insubstantial modifications to the present invention made according to the conception should fall within the protection scope of the present invention.

I claim:

1. An easy-to-fold and easy-to-assemble box comprising:
a left panel,
a right panel,
a front frame,
a rear frame,
a bottom panel, and
a top cover;
wherein the left panel and the right panel are formed by connecting two or more sideboards in a vertical direction through a first rotatable connector;
the bottom panel has a rotatable connection end and a movable end;
the rotatable connection end is rotatably connected to a lower part of the front frame or a lower part of the rear frame through a second rotatable connector;
a bottom surface of the movable end abuts against the lower part of the rear frame or the lower part of the front frame;
an inner side of each of the two ends of the front frame or the rear frame is provided with a vertical edge strip;
the length of the vertical edge strip along a length extending direction of the left panel is equal to or more than the thickness of the bottom panel;
one end of both, the left panel and the right panel, is connected to the vertical edge strip through a third rotatable connector;
an other end of both, the left panel and the right panel is correspondingly connected to the rear frame or the front frame;
the top cover is connected to an upper part of an outer wall of the front frame or the rear frame through a 360-degree rotational connector;
the top cover is turned downward to abut against an outer side wall of the front frame or the rear frame;
the bottom panel is turned upward to abut against an inner wall of the front frame or the rear frame; and the sideboards of the left panel and the right panel are sequentially folded to make the front frame and the rear frame move toward each other, so as to fold the box.

2. The easy-to-fold and easy-to-assemble box of claim 1, wherein the left panel and the right panel are both formed by connecting two sideboards through a hinge; the lower part of the rear frame or the front frame is provided with a support bar; a bottom surface of the bottom panel is horizontally supported by the support bar on a top surface of the support bar; and the bottom panel is provided with a handle hole.

3. The easy-to-fold and easy-to-assemble box of claim 1, wherein a door panel or cloth is arranged within the front frame; and a door panel or cloth is arranged within the rear frame.

* * * * *